May 9, 1950 K. WILLIAMS 2,507,327
HAND BRAKE
Filed March 14, 1946 3 Sheets-Sheet 2
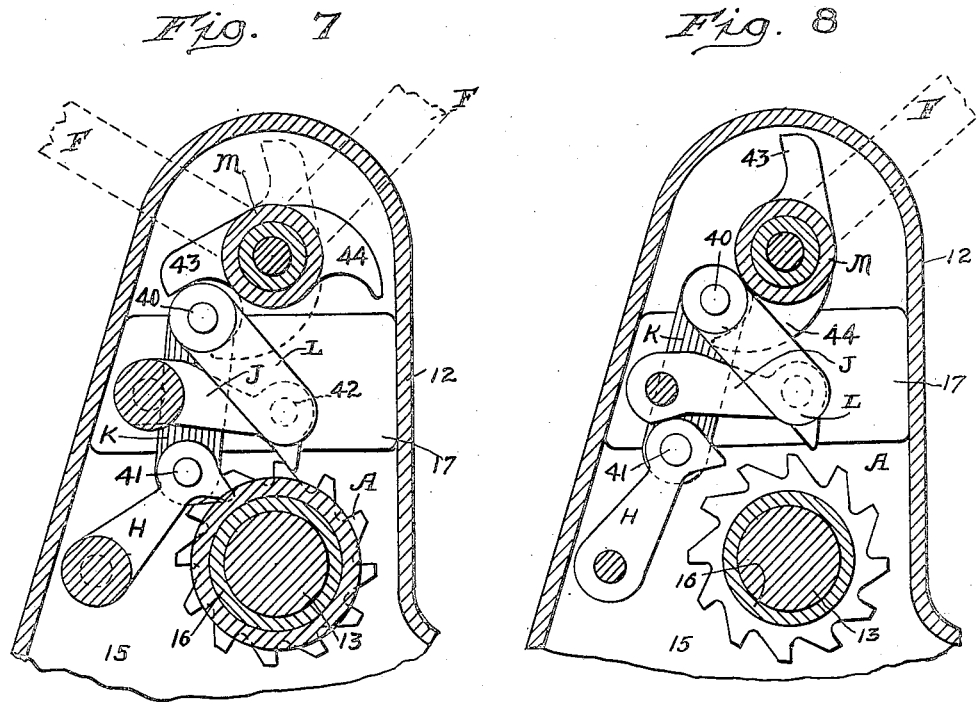
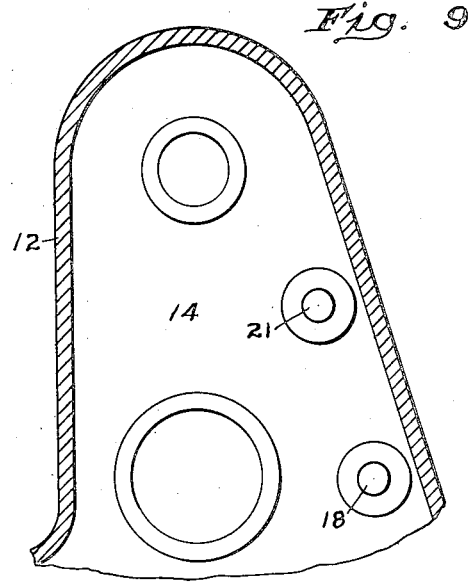
Inventor:
Keith Williams.
By George D. Haight
Atty.

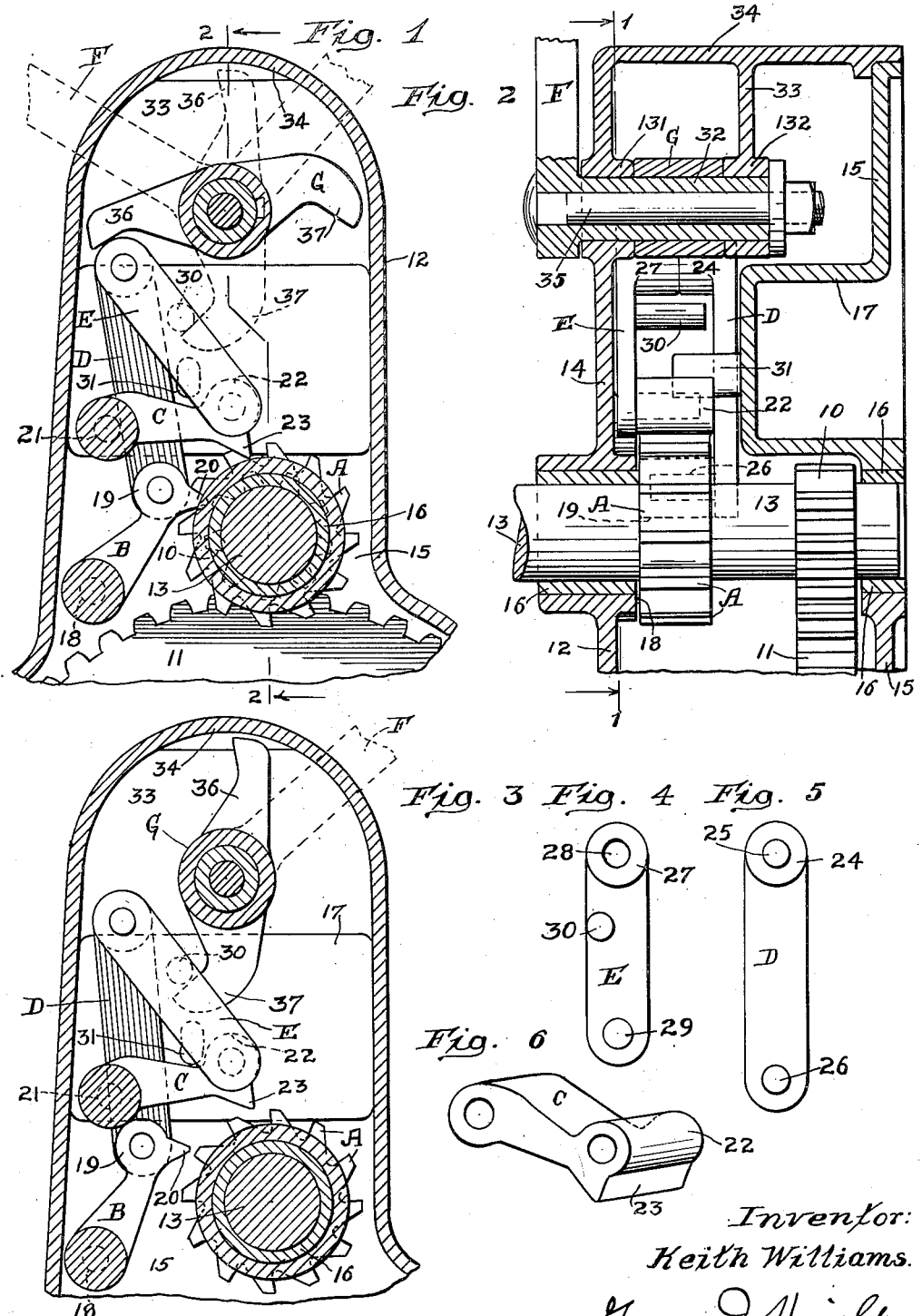

May 9, 1950         K. WILLIAMS         2,507,327
HAND BRAKE
Filed March 14, 1946                                3 Sheets-Sheet 3
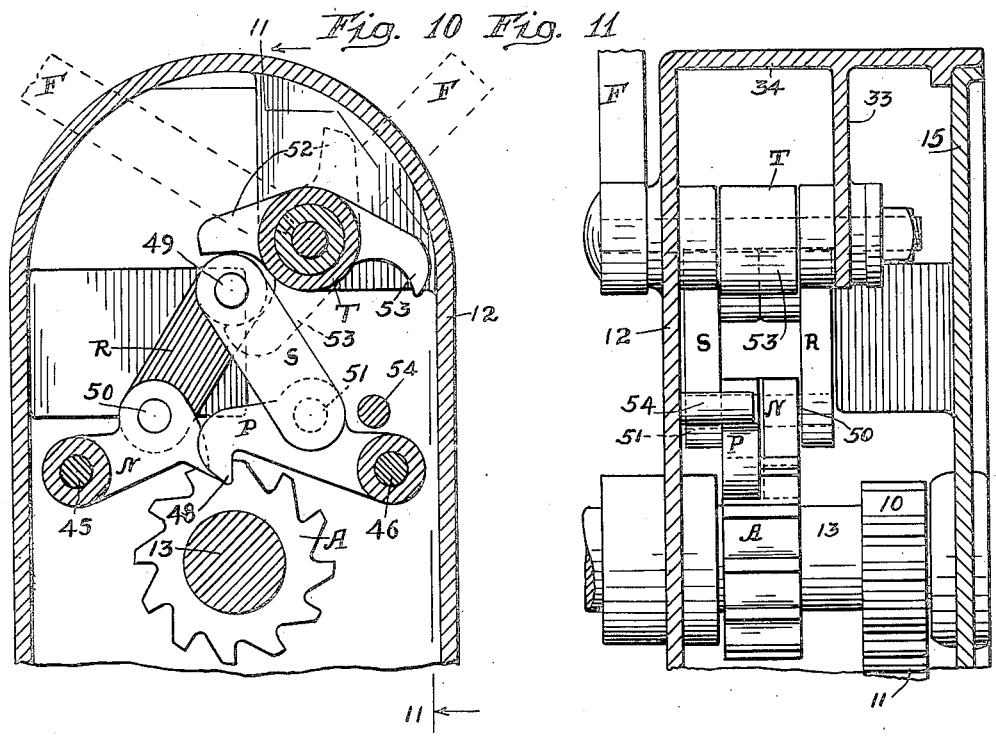
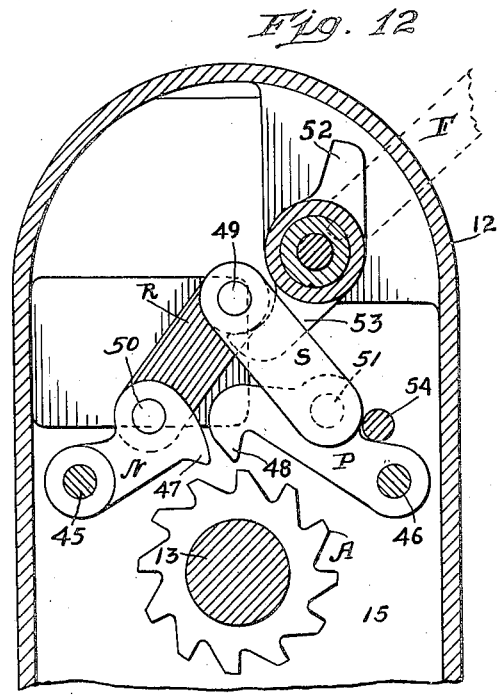
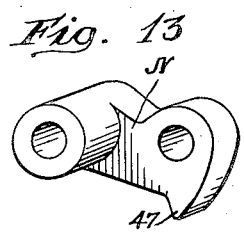
Inventor:
Keith Williams.
By George D. Haight
Atty.

Patented May 9, 1950

2,507,327

UNITED STATES PATENT OFFICE 2,507,327

HAND BRAKE

Keith Williams, Buffalo, N. Y.

Application March 14, 1946, Serial No. 654,299

12 Claims. (Cl. 188—81.1)

This invention relates to improvements in hand brakes for railway cars.

One object of the invention is to provide a simple and efficient hand brake mechanism comprising a rotatable brake-tightening element and ratchet means for locking said element against rotation, including a ratchet wheel and a set of two cooperating dogs having staggered engagement with the ratchet wheel to provide for relatively fine adjustment in tightening the brakes, wherein the dogs are positively thrown into and out of engagement with the ratchet wheel by a single actuating lever and the pressure exerted on the dogs by the lever in forcing the same into engagement with the teeth of the ratchet wheel is equalized to insure proper engagement thereof.

A further object of the invention is to provide a hand brake mechanism, as set forth in the preceding paragraph, wherein toggle link pressure transmitting means is employed between the actuating lever and the dogs to equalize the pressure on the dogs in forcing the same into engagement with the ratchet wheel.

A more specific object of the invention is to provide a hand brake mechanism of the power-multiplying gear-driven type, including a rotary brake-tightening element; a ratchet wheel rotatable with said element; and a pair of pivoted locking dogs having staggered engagement with the teeth of the ratchet wheel, wherein the dogs are positively moved into and out of engagement by toggle link means and a cooperating lever, the toggle link means connecting the dogs, and the lever exerts pressure on the toggle link means at or near the hinge thereof to open and close the same and thereby force the dogs into and out of engagement with the ratchet wheel.

Other objects of the invention will more clearly appear from the description and claims hereinafter following.

In the drawings forming a part of this specification,

Fig. 1 is a transverse vertical sectional view, corresponding substantially to the line 1—1 of Fig. 2, showing the upper portion of a power-multiplying hand brake mechanism and illustrating my improvements in connection therewith;

Fig. 2 is a vertical sectional view in a plane at right angles to the sectional view in Fig. 1, corresponding substantially to the offset line 2—2 of Fig. 1;

Fig. 3 is a view similar to Fig. 1, showing the locking dogs in released position;

Figs. 4 and 5 are side elevational views of the respective links of the toggle means;

Fig. 6 is a detailed perspective view of one of the locking dogs;

Fig. 7 is a view similar to Fig. 1, illustrating another embodiment of the invention;

Fig. 8 is a view similar to Fig. 7, showing the locking dogs released from the ratchet wheel;

Fig. 9 is a transverse, vertical sectional view through the housing illustrated in Figs. 7 and 8, looking at the inner side of the front wall of said housing;

Fig. 10 is a view similar to Fig. 1, illustrating still another embodiment of the invention;

Fig. 11 is a vertical sectional view, corresponding substantially to the offset line 11—11 of Fig. 10;

Fig. 12 is a view similar to Fig. 10, showing the dogs in released position; and Fig. 13 is a detailed perspective view of one of the locking dogs shown in Figs. 10, 11, and 12.

As illustrated in the drawings, my improvements are embodied in a well-known type of power-multiplying gear-driven brake, including the usual brake drum (not shown) on which the chain is wound, the drum being rotated by a driving pinion 10 actuated by the hand wheel of the brakes (not shown), and meshing with a gear 11 which is rotatable with the winding drum. The parts of the mechanism are contained in the usual housing 12, the upper portion only of which is shown.

Referring first to the embodiment of the invention illustrated in Figs. 1 to 6, inclusive, my improved hand brake mechanism proper comprises broadly a ratchet wheel A; two locking dogs B and C, having staggered engagement with the teeth of the ratchet wheel; a pair of toggle links D and E connected to the dogs and adapted to transmit both compression and tension stress; an operating lever F; and a trip element G actuated by the lever and cooperating with the toggle links.

The ratchet wheel A is fixed to the shaft 13 which also has a pinion fixed thereto. The shaft 13 is journaled in bearing openings in the front and rear walls 14 and 15 of the housing. These bearing openings are provided with the usual bushings 16—16. The shaft 13 extends entirely through the front wall 14 of the housing and projects outwardly therefrom to accommodate the usual hand wheel which is fixed thereto. The rear wall of the housing is in the form of a detachable plate which has an inwardly offset portion 17 immediately above the shaft 13 and its pinion 10.

The locking dog B is disposed to one side of the ratchet wheel and is pivotally supported at its inner end by a pin 18 in the form of a trunnion projecting from the inner side of the front wall 14 of the housing. At the outer end, that is, the end remote from the pivot thereof, the dog B has an enlarged head portion 19 having a projecting tooth 20 adapted to engage with the teeth of the ratchet wheel A.

The dog C is supported above the ratchet wheel A and the dog B, being pivotally mounted at its inner end on a trunnion-like pin 21 also projecting from the inner side of the front wall 14 of the housing. At its outer end, the dog C has an enlarged head portion 22 provided with a projecting tooth 23 adapted to engage with the teeth of the ratchet wheel.

The link D is in the form of an elongated flat bar, having a laterally projecting cylindrical boss 24 at its upper end which is on the inner side thereof. The boss 24 is provided with a central bearing projection in the form of a short pin 25. At the lower end of this link, a laterally projecting pin 26 is provided, which is formed integral therewith and located on the same side of the link as the pin 25.

The link E is also in the form of a flat bar, but is of lesser length than the link D. At the upper end thereof, the link E has a laterally projecting boss 27 on its inner side provided with a central bore or bearing opening 28 adapted to receive the pin 25 of the link D. At its lower end, the link E has a laterally projecting pin 29, which is on the same side thereof as the boss 27 and is preferably formed integral with said link. Laterally projecting from the inner side of this link below the boss 27 is a cylindrical trunnion or pin 30 which, as shown in Fig. 4, is near one edge of said link. The links D and E are arranged side by side and are pivotally connected to each other at their upper ends by the pin 25 of the link D, which is engaged in the bearing opening 28 of the link E. The lower ends of the links D and E are connected respectively to the dogs B and C, the pin 26 of the link D being journaled in a pivot opening provided in the head of the dog B and the pin 29 of the link E in a pivot opening provided in the head of the dog C. The connected links D and E form a toggle arrangement between the dogs B and C. As will be seen upon reference to Fig. 2, the two links D and E are disposed at opposite sides of the dogs and are embraced between the front wall 14 and the inwardly offset portion 17 of the rear wall 15 of the housing and are held assembled by being confined therebetween. The offset wall portion 17 has an inwardly projecting, horizontally disposed stop lug 31 thereon, which is in the path of upward movement of the dog C to limit swinging movement of said dog away from the ratchet wheel.

The actuating lever F is arranged exteriorly of the housing, being supported for swinging movement. This lever has a laterally inwardly projecting hollow shaft portion 32 at its lower end, which is formed integral therewith and is journaled in the openings of aligned bearing members 131 and 132 provided on the front wall of the housing and on a web member 33 intermediate the front and rear walls of said housing and depending from the top wall 34 thereof.

The trip element G is mounted on the shaft portion 32 of the lever between the bearing members 131 and 132 and is confined against endwise movement on said shaft by these bearing members. The lever F is held assembled with the housing by a bolt 35 extending through the opening of the shaft portion 32 and is locked in place by a nut at its inner end and a washer interposed between the nut and the bearing member 132.

The trip element G comprises a cylindrical collar having radially oppositely projecting arms 36 and 37, the outer end portions of which are of hook-shape.

The dogs B and C are designed to have staggered engagement with the teeth of the ratchet wheel, that is, they are arranged so that, when either dog is fully engaged with a tooth of the ratchet wheel, the engaging tooth of the other dog is half-way between two adjacent teeth of said wheel. As clearly shown in Fig. 1, relatively fine ratcheting adjustment is thus provided, the dogs being adapted to lock the ratchet wheel against rotation each time the wheel is rotatably advanced the distance of half a tooth.

The operation of the improved hand brake mechanism shown in Figs. 1 to 6 inclusive, is as follows: As the brakes are being applied by rotation of the shaft 13 and the ratchet wheel A in clockwise direction, as shown in Fig. 1, the dogs B and C ratchet over the teeth of the wheel, both dogs being yieldingly urged toward the ratchet wheel by the action of gravity and the added pressure exerted by the weight of the lever F through the trip element G and the links D and E, the lever being in the left-hand dotted line position shown in Fig. 1, and the arm 36 of the trip element bearing on the upper ends of the links at their pivotal or hinged connection. Assuming that the brake has been set, and it is desired to release the same, the attendant swings the lever F to the right and to the dotted line position shown in Fig. 3, thereby forcibly lifting both dogs out of engagement with the ratchet wheel, the arm 37 of the element G being engaged underneath the pin 30 of the links and lifting the links and the connected dogs. The weight of the overbalanced lever F maintains the dogs in disengaged position until the lever is thrown back to the position shown in Fig. 1. Throwing the lever to this last-named position forcibly engages both dogs with the teeth of the ratchet wheel, the pressure being transmitted through the links D and E and the trip element G, the arm 36 of which engages the pivotally connected or hinged upper ends of the links. As will be evident, when the brakes are being tightened by rotation of the ratchet wheel A, the dogs being staggered with respect to the teeth of said wheel alternately drop into holding engagement, thus effectively locking the ratchet wheel and the brake mechanism against rotation at intervals of rotary advance of said wheel corresponding to one-half of the amount of rotation thereof to advance the same one tooth, thus permitting the brakeman to tightly set the brakes even when the resistance encountered is too great to allow the ratchet wheel to be advanced the distance of one tooth. A decided advantage is thus obtained over the commonly used single dog type of ratchet brake mechanism.

In addition to providing for forcible manual disengagement of the dogs B and C by operation of the lever F, automatic disengagement thereof may be effected by swinging the lever F to the right-hand dotted line position shown in Fig. 1, thus bringing the arm 37 in bearing engagement with the pin 30. The brakes are then tightened slightly by rotation of the ratchet wheel in clockwise direction to relieve the pressure on the tooth of the particular dog which is locked to the ratchet wheel, thereby permitting the dogs to be lifted out of engagement by the weight of the overbalanced lever F acting through the arm 37 to lift the links.

Referring next to the embodiment of the invention illustrated in Figs. 7, 8, and 9, the construction is substantially the same as that hereinbefore described, with the exception that the lifting arm of the trip element engages the pivotal connection of the links instead of the pin on one of the links, to lift the dogs to their disengaged position.

My improved mechanism, as shown in Figs. 7, 8, and 9, comprises broadly a ratchet wheel identical with the ratchet wheel A hereinbefore described, and also indicated by A; a pair of locking dogs H and J; a pair of links K and L adapted to transmit both tension and compression stress; a trip element M; and an operating lever similar to the operating lever F hereinbefore described and also indicated by F.

The dogs H and J are similar to the dogs B and C hereinbefore described and cooperate with the ratchet wheel A in a like manner. The two links K and L are connected at their upper ends by a pivot 40 and have their lower ends connected to the outer ends of the dogs H and J respectively by pivots 41 and 42. The trip element M is actuated by swinging movement of the lever F and has a pair of radial arms 43 and 44, which are adapted to engage with the pivotal connection at the upper ends of the links to either force the links downwardly or lift the same. As shown in Fig. 7, the arm 43 of the trip element engages with the pivotal connection of the links to force the dogs into engagement with the ratchet wheel and hold the same yieldingly engaged. As shown in Fig. 8, the arm 44 engages the pivotal connection of the links from underneath to lift the dogs to disengaged position and maintain them in that position.

Referring to the embodiment of the invention illustrated in Figs. 10, 11, 12, and 13, the mechanism is similar to that described in connection with Figs. 7 and 8, with the exception that the dogs are arranged at opposite sides of the ratchet wheel and act in opposite directions.

As shown in Figs. 10 to 13 inclusive, my improved mechanism comprises broadly a ratchet wheel in all respects similar to the ratchet wheel A hereinbefore described and also indicated by A; a pair of locking dogs N and P; a pair of links R and S adapted to transmit both tension and compression stress; a trip element T; and an operating lever similar to the lever F hereinbefore described and also indicated by F.

The dogs N and P are pivoted at their outer ends on pivot pins 45 and 46 respectively and have toothed engagement at their inner ends with the ratchet wheel A, the dog N being provided with the usual depending tooth 47, and the dog P having a hook-shaped tooth 48.

The links R and S are pivotally connected to each other at their upper ends by a pivot pin 49 and have their lower ends pivotally connected respectively to the dogs N and P, the link R being connected to the outer end of the dog N by a pivot 50 and the link S being pivotally connected at its lower end to the dog P, intermediate the ends of the latter, by a pivot pin 51.

The trip element T, which is actuated by swinging movement of the lever F, has radially extending arms 52 and 53 respectively adapted to engage with the upper pivotal connection of the links to either depress the links or lift the same. As shown in Fig. 10, the arm 52 is engageable with the upper side of the pivotal connection of the links to depress the links and force the dogs into engagement with the ratchet wheel. As shown in Fig. 12, the arm 53 is engageable beneath said pivotal connection of the links to lift the links and disengage the dogs from the ratchet wheel. A stop pin 54 extending from the front wall 12 of the housing positively limits upward swinging movement of the dog P, thereby limiting swinging movement of the lever F. The extreme movement of this lever in a direction to the right is indicated in dotted lines in Fig. 12.

The operations of the mechanism shown in Figs. 7 and 8, and that of the mechanism shown in Figs. 10, 11, and 12, are substantially the same as the operation of the mechanism hereinbefore described in connection with Figs. 1 to 6 inclusive.

I claim:

1. In a hand brake mechanism, the combination with a member adapted to be rotated to effect tightening of the brakes; of a ratchet wheel rotatable with said member; a pair of dogs having pivot points in spaced relation and having ratcheting engagement with said wheel; toggle link means connecting said dogs and adapted to transmit both compression and tension stress; and lever means for applying compression and tension stress to said toggle link means for positively moving the dogs into and out of engagement with said ratchet wheel.

2. In a hand brake mechanism, the combination with a member adapted to be rotated to effect tightening of the brakes; of a ratchet wheel rotatable with said member; a pair of locking dogs having pivot points in spaced relation and having ratcheting engagement with said wheel; a link connected to each dog for actuating the same and adapted to transmit both compression and tension stress, said links being pivotally connected to each other; and means engageable with at least one of said links at a point remote from the dogs for applying compression and tension stress to said links to engage positively the dogs with said ratchet wheel and disengage the same therefrom.

3. In a hand brake mechanism, the combination with a rotary brake tightening member; of a ratchet wheel rotatable with said member; a pair of dogs having pivot points in spaced relation and having staggered engagement with the teeth of said wheel; a link connected to each dog and adapted to transmit compression stress, said links being pivotally connected to each other remote from the connections thereof with said dogs; and lever actuated means engageable with said links at their pivotal connection for applying compression stress to said links to cause said dogs to engage positively said ratchet wheel.

4. In a hand brake mechanism, the combination with a rotary brake tightening member; of a ratchet wheel rotatable with said member; a pair of pivoted dogs having pivot points in spaced relation and having staggered engagement with said ratchet wheel; toggle link means connecting said dogs and adapted to transmit both compression and tension stress; and actuating means cooperating with the hinge of said toggle means for applying compression and tension stress to said dogs to move the same positively into and out of engagement with the ratchet wheel.

5. In a hand brake mechanism, the combination with a rotary brake tightening member; of a ratchet wheel rotatable with said member; a pair of dogs having pivot points in spaced relation and having staggered ratcheting engagement with said wheel, each dog being pivoted at its inner end and having a tooth at its outer end engageable with said ratchet wheel; a toggle connection between said links and adapted to transmit both compression and tension stress; and lever-operated means cooperating with the hinge of said toggle connection for applying compression and tension stress to said dogs to move the same positively into and out of engagement with the ratchet wheel.

6. In a hand brake mechanism, the combination with a rotary brake tightening member; of a ratchet wheel rotatable with said member; a pair of dogs having pivot points in spaced relation and having staggered ratcheting engagement with said wheel, each dog being pivoted at its inner end and having a tooth at its outer end engageable with said ratchet wheel; a link pivotally connected at its lower end to each dog at a point remote from the pivot of said dog and adapted to transmit compression stress; means hingedly connecting said links to each other at their upper ends; and lever means engageable with said hinged connection of the links for applying compression stress to the links to cause said dogs to engage positively said ratchet wheel.

7. In a hand brake mechanism, the combination with a rotary brake tightening member; of a ratchet wheel rotatable with said member; a pair of dogs having staggered ratcheting engagement with said wheel, each dog being pivoted at one end and having a tooth at its other end engageable with said wheel; a pair of links pivotally connected to each other at their upper ends, the lower ends of said respective links being pivotally connected to said dogs respectively remote from the pivots thereof; and lever actuated means engageable with said pivotal connection of said links for lifting and lowering said links to disengage the dogs from and engage the same with said ratchet wheel.

8. In a hand brake mechanism, the combination with a rotary brake tightening member; of a ratchet wheel rotatable with said member; a pair of pivoted dogs having staggered engagement with said wheel; an upstanding link pivotally connected to each dog at a point remote from the pivot of the latter, said links being pivotally connected to each other at their upper ends; and swinging trip means having shouldered engagement with said links at the pivotal connection thereof with each other for depressing said links and forcing the connected dogs into engagement with the ratchet wheel when said trip means is swung in one direction and withdrawing the connected dogs from engagement with the ratchet wheel when swung in a reverse direction.

9. In a hand brake mechanism, the combination with a rotary brake tightening member; of a ratchet wheel rotatable with said member; a pair of pivoted dogs having staggered engagement with said wheel; an upstanding link connected to each dog at a point remote from the pivot of the latter, said links being pivotally connected to each other at their upper ends; and swinging lever-operated means having shouldered engagement with said links at their pivotal connection with each other for raising and lowering the links to disengage the dogs from and engage the same with said ratchet wheel.

10. In a hand brake mechanism, the combination with a rotary brake tightening member; of a ratchet wheel rotatable with said member; a dog pivoted at one end and having a tooth at the other end engageable with said ratchet wheel; an upstanding link pivotally connected at its lower end to the toothed end of the dog; a second dog pivoted at one end and having a tooth at the other end engageable with said ratchet wheel, said dogs being mounted for staggered ratcheting engagement with said wheel; a second upstanding link pivotally connected at its lower end to the toothed end of said second-named dog; pivot means hingedly connecting said first and second-named links to each other at their upper ends; a laterally projecting lug on said second-named link between its upper and lower ends; and a lever-operated rotary trip element having radial arms, one of said arms being engageable with the hinged connection of said links to depress the same and force the dogs into engagement with the ratchet wheel when said trip element is rotated in one direction, the other of said arms being engageable with said projecting lug of said second-named link to lift the links and disengage the dogs from the ratchet wheel when said trip element is reversely rotated.

11. In a hand brake mechanism, the combination with a rotary brake tightening member; of a ratchet wheel rotatable with said member; a lever-actuated rotary trip element having a pair of radial arms; a pair of pivoted dogs having staggered ratcheting engagement with said wheel; an upstanding link pivotally connected at its lower end to one of said dogs; and a second upstanding link pivotally connected at its lower end to the other dog, said connections between said links and said dogs being eccentric to the pivotal axis of each of said dogs, said links being hingedly connected to each other at their upper ends, said hinged connection being in the path of rotary movement of the arms of said trip element to be engaged by one of said arms when the trip element is rotated in one direction to lift said links and disengage said dogs from the ratchet wheel, and to be engaged by the other of said arms when the trip element is rotated in a reverse direction to depress said links and force the dogs into engagement with the ratchet wheel.

12. In a hand brake mechanism, the combination with a rotary winding member; of ratchet means for locking said winding member against rotation, including a pair of pivoted dogs having pivot points in spaced relation; toggle link means operatively connecting said dogs to each other and adapted to transmit both compression and tension stress; and lever means for applying compression and tension stress to said toggle link means to move said dogs positively into and out of engagement with the ratchet wheel.

KEITH WILLIAMS.

REFERENCES CITED

The following references are of record in the file of this patent:

UNITED STATES PATENTS

| Number | Name | Date |
|---|---|---|
| 862,468 | Gillentine | Aug. 6, 1907 |
| 1,510,333 | O'Connor | Sept. 30, 1924 |